US009263926B2

(12) United States Patent
Hamer et al.

(10) Patent No.: US 9,263,926 B2
(45) Date of Patent: Feb. 16, 2016

(54) PERMANENT MAGNET ELECTRIC MACHINE HAVING MAGNETS PROVIDED WITH A THERMAL ENHANCEMENT BONDING COATING

(75) Inventors: Colin Hamer, Noblesville, IN (US); Koon Hoong Wan, Fishers, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 457 days.

(21) Appl. No.: 13/608,514

(22) Filed: Sep. 10, 2012

(65) Prior Publication Data

US 2014/0070654 A1  Mar. 13, 2014

(51) Int. Cl.
*H02K 21/12* (2006.01)
*H02K 9/22* (2006.01)
*H02K 1/27* (2006.01)

(52) U.S. Cl.
CPC .............. *H02K 9/22* (2013.01); *H02K 1/2766* (2013.01)

(58) Field of Classification Search
CPC .............................. H02K 9/22; H02K 1/2766
USPC .................. 310/156.21, 156.23, 156.31, 45, 310/156.08, 156.53
See application file for complete search history.

(56) References Cited

U.S. PATENT DOCUMENTS

| 6,437,473 | B1* | 8/2002 | Mobius et al. | 310/156.21 |
|---|---|---|---|---|
| 6,891,297 | B2* | 5/2005 | Shimada et al. | 310/156.01 |
| 7,649,293 | B2 | 1/2010 | Maldener et al. | |
| 8,237,320 | B2* | 8/2012 | Saban et al. | 310/156.27 |
| 2004/0046469 | A1* | 3/2004 | Oshima et al. | 310/156.53 |
| 2004/0051415 | A1 | 3/2004 | Hamamura et al. | |
| 2005/0156474 | A1* | 7/2005 | Endo | 310/156.53 |
| 2006/0043810 | A1* | 3/2006 | Shimizu et al. | 310/156.08 |
| 2011/0133590 | A1 | 6/2011 | Lokhandwalla et al. | |
| 2012/0161565 | A1* | 6/2012 | Bilcai et al. | 310/154.07 |
| 2013/0241324 | A1* | 9/2013 | Mader et al. | 310/45 |
| 2013/0313923 | A1* | 11/2013 | Hamer et al. | 310/45 |
| 2014/0054985 | A1* | 2/2014 | Neiszer | 310/43 |

FOREIGN PATENT DOCUMENTS

KR  10-2012-0006358 A  1/2012

OTHER PUBLICATIONS

International Search Report and Written Opinion for PCT Application No. PCT/US2013/058389, dated Dec. 20, 2013, pp. 1-13.

* cited by examiner

*Primary Examiner* — Thanh Lam
(74) *Attorney, Agent, or Firm* — Cantor Colburn LLP

(57) ABSTRACT

A rotor assembly for a permanent magnet electric machine includes a plurality of rotor laminations joined to form a rotor body. Each of the plurality of rotor laminations includes a plurality of slots. One or more permanent magnets are mounted within respective ones of the plurality of slots. Each of the one or more permanent magnets includes a thermal enhancement bonding coating. A method of forming a rotor assembly is also disclosed.

14 Claims, 5 Drawing Sheets

PERMANENT MAGNET ELECTRIC MACHINE HAVING MAGNETS PROVIDED WITH A THERMAL ENHANCEMENT BONDING COATING

BACKGROUND OF THE INVENTION

Exemplary embodiments pertain to the art of electric machines and, more particularly to a permanent magnet electric machine having magnets provided with a thermal enhancement bonding coating.

Electric machines produce work from electrical energy passing through a stator to induce an electro-motive force in a rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. In the case of permanent magnet electric machines, magnets are being designed to possess a higher flux density in a smaller form-factor. Such magnets generally are formed from, or include, various rare earth metals.

BRIEF DESCRIPTION OF THE INVENTION

Disclosed is a rotor assembly for a permanent magnet electric machine. The rotor assembly includes a plurality of rotor laminations joined to form a rotor body. Each of the plurality of rotor laminations includes a plurality of slots. One or more permanent magnets are mounted within respective ones of the plurality of slots. Each of the one or more permanent magnets includes a thermal enhancement bonding coating.

Also disclosed is a permanent magnet electric machine including a housing, a stator mounted within the housing, and a rotor assembly rotatably mounted within the housing relative to the stator. The rotor assembly includes a plurality of rotor laminations. Each of the plurality of rotor laminations includes a plurality of slots and one or more permanent magnets mounted within respective ones of the plurality of slots. Each of the one or more permanent magnets includes a thermal enhancement bonding coating.

Further disclosed is a method of forming a rotor assembly. The method includes stacking a plurality of rotor laminations, aligning a plurality of slots formed in each of the plurality of rotor laminations, joining the plurality of rotor laminations to form a rotor body, covering a permanent magnet with a thermal enhancement bonding coating, inserting the permanent magnet into one of the plurality of slots, and activating the thermal enhancement bonding coating to join the permanent magnet to the plurality of rotor laminations and establish a thermal flow path between the permanent magnet and the rotor body.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
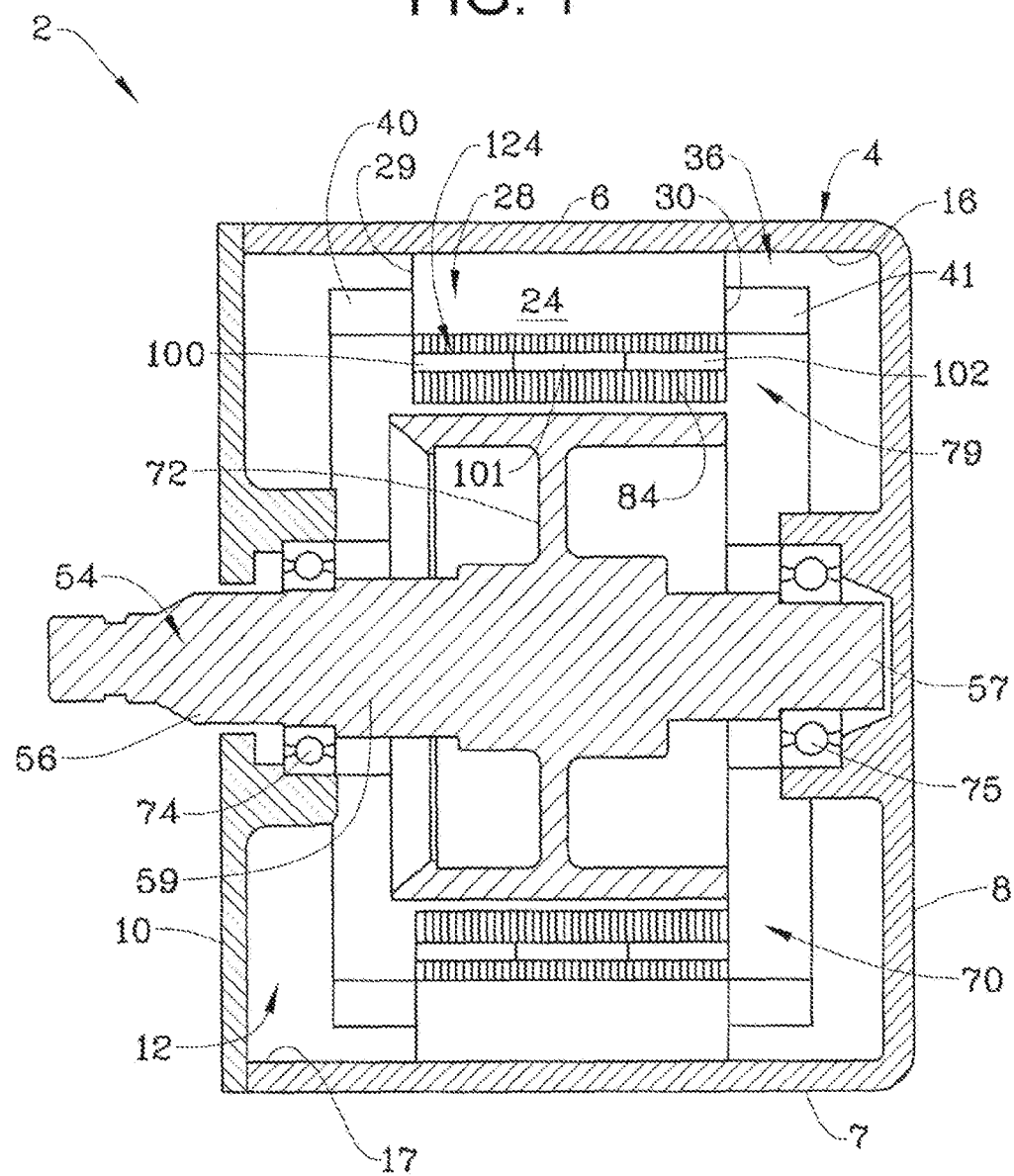
FIG. 1 depicts a cross-sectional side view of a permanent magnet electric machine including a rotor assembly having permanent magnets provided with a thermal enhancement bonding coating.

A permanent magnet electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes a first inner surface 16 and second side wall 7 includes a second inner surface 17. At this point it should be understood that housing 4 could also be constructed to include a single side wall having a continuous inner surface. Electric machine 2 is further shown to include a stator 24 arranged at first and second inner surfaces 16 and 17 of first and second side walls 6 and 7. Stator 24 includes a body 28, having a first end portion 29 that extends to a second end portion 30, which supports a plurality of windings 36. Windings 36 include a first end turn portion 40 and a second end turn portion 41.

Figure 2:
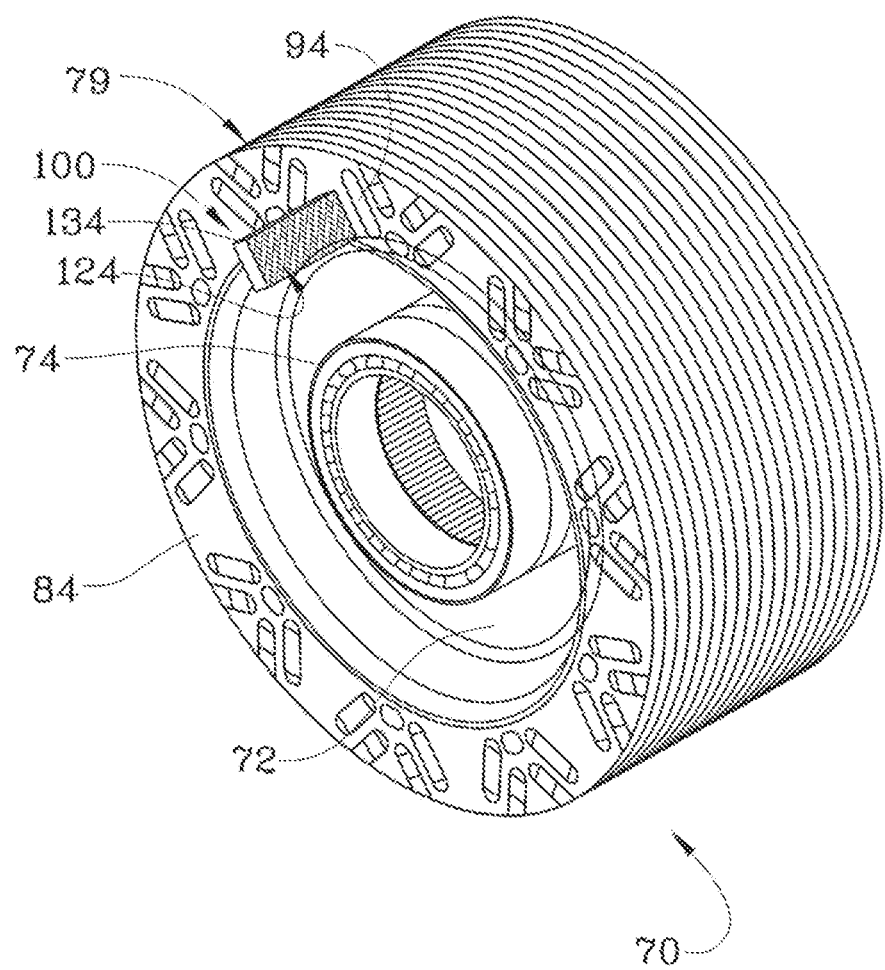
FIG. 2 depicts a perspective view of the rotor assembly of FIG. 1.

Electric machine 2 is also shown to include a shaft 54 rotatably supported within housing 4. Shaft 54 includes a first end 56 that extends to a second end 57 through an intermediate portion 59. Shaft 54 supports a rotor assembly 70. Rotor assembly 70 includes a hub 72 including a first bearing 74 that supports first end 56 relative to second end wall 10, and a second bearing 75 that supports second end 57 relative to first end wall 8. Of course it should be understood that bearings 74 and 75 need not be part of hub 72. In such an arrangement, bearings 74 and 75 may be mounted to housing 4. Rotor assembly 70 includes a rotor body 79 formed from a plurality of rotor laminations, one of which is indicated at 84. Each rotor lamination 84 includes a plurality of slots, one of which is indicated at 94 in FIG. 2. Rotor laminations 84 are stacked and slots 94 are aligned prior to undergoing a bonding process that forms rotor body 79. A plurality of permanent magnets (PM) 100, 101, and 102 are provided in rotor body 79 in slots 94.

In accordance with an exemplary embodiment, PM 100 includes a body 114 that is covered with a thermal enhancement bonding coating 124. Thermal enhancement bonding coating 124 generally takes the form of a solder paste 134 that includes a solder material and a flux material. In accordance with an aspect of the exemplary embodiment, the solder material includes tin. In accordance with another aspect of the exemplary embodiment, the flux material includes a thermal interface material (TIM) that facilitates heat exchange from PM 100. The TIM may include metal components and/or ceramic components. Examples of metal components may include copper and aluminum. Examples of ceramic components may include boron nitride and beryllium oxide. At this point it should be understood that PM 101 and PM 102 may also be provided with thermal enhancement bonding coating 124.

Figure 3:
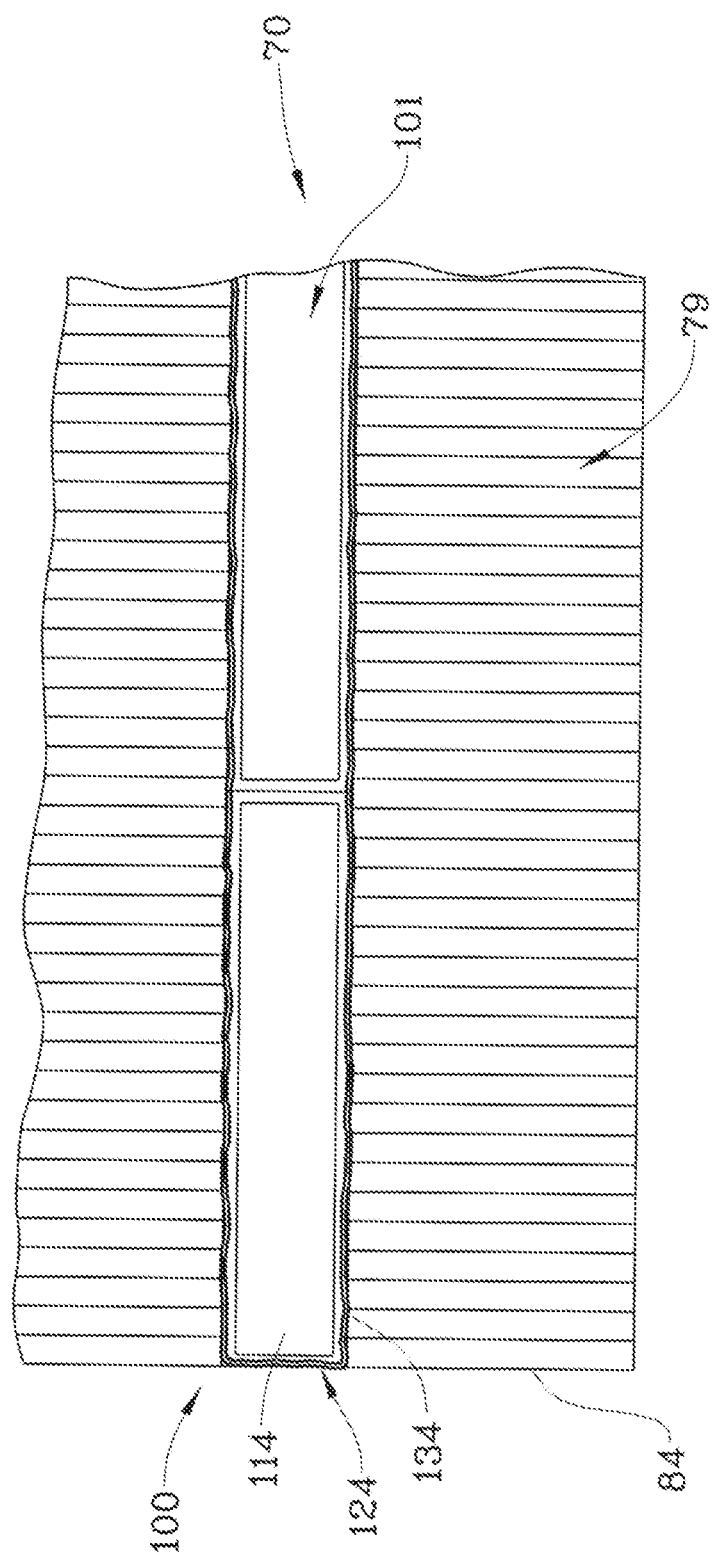
FIG. 3 depicts a partial cross-sectional side view of a permanent magnet having a thermal enhancement bonding coating being inserted into the rotor assembly of FIG. 2.
Figure 4:
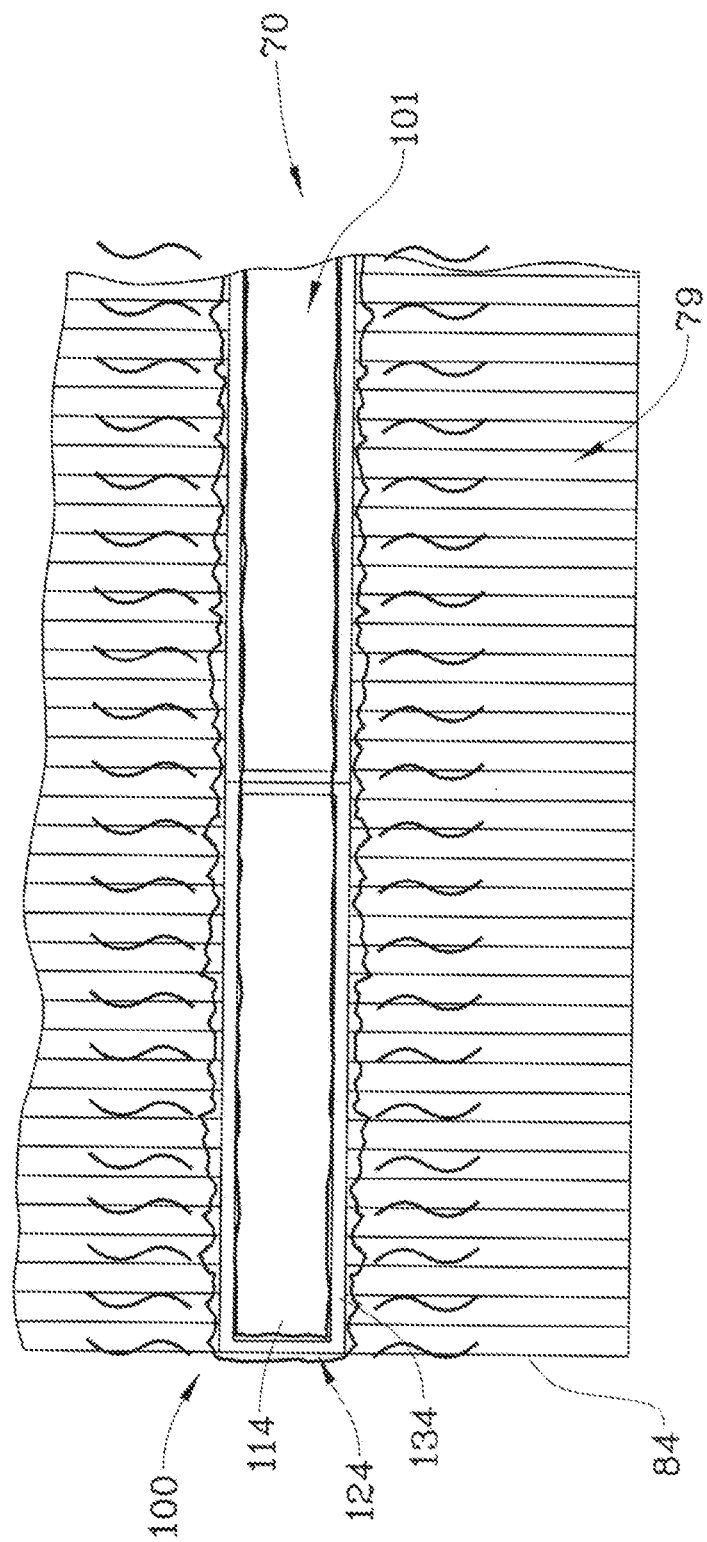
FIG. 4 depicts the rotor assembly of FIG. 3 being exposed to a heat soak creating a re-flow of the thermal enhancement bonding coating.
Figure 5:
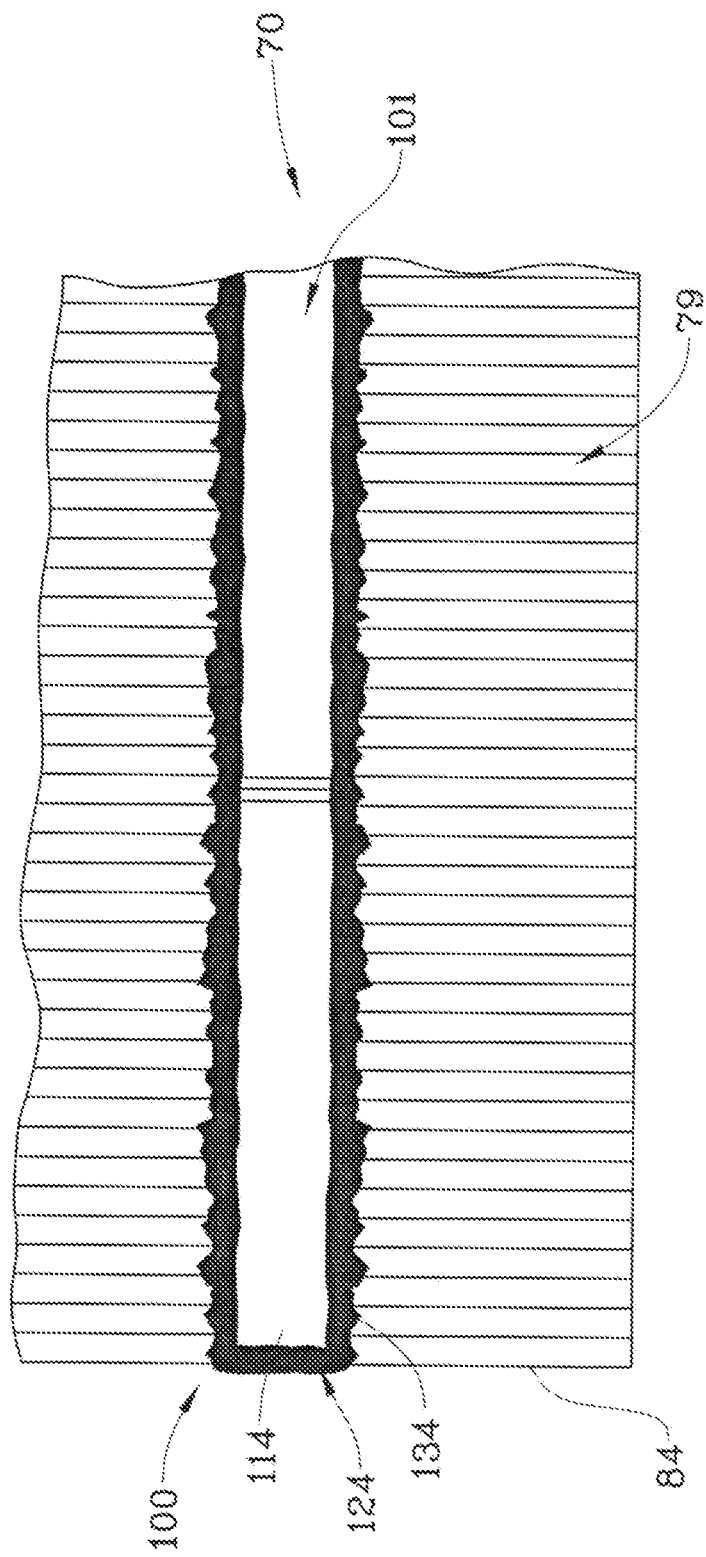
FIG. 5 depicts the rotor assembly of FIG. 4 after the thermal enhancement bonding coating has solidified bonding the permanent magnet to rotor laminations of the rotor assembly.

Once coated, PM 100, PM 101, and PM 102 are inserted into slot 94 as shown in FIG. 3. Additional permanent magnets are inserted into others of slots 94 and rotor body 79 is exposed to an activating input. In accordance with an aspect of the exemplary embodiment, the activating input takes the form of a heat soak that causes a re-flow of solder paste 134. The re-flow allows solder paste 134 to flow into and in-between the plurality of rotor laminations 84. Once the re-flow is complete, the activating input is stopped and thermal enhancement bonding coating 124 is allowed to solidify as shown in FIG. 5. At this point, the permanent magnets are bonded to rotor laminations 84. In addition, thermal enhancement bonding coating 124 establishes a thermal flow path from the permanent magnets to the rotor body 79 allowing rotor assembly 70 to more easily dissipate heat.

At this point it should be understood that the exemplary embodiments provide permanent magnets in a PM electric machine with a thermal enhancement bonding coating that not only establishes a desired retention between the permanent magnets and a rotor, but also facilitates heat removal. Specifically, components of the solder material, such as tin, not only facilitate a chemical bond to rotor laminations, but also enhance a thermal connection between the permanent magnets and rotor body allowing heat to flow more easily from rotor assembly. In addition, while described as being a solder flux, other materials that, when exposed to an activating input are caused to flow into the rotor laminations to establish a bond and a thermal flow path may also be employed. Specifically, the type and chemical make-up of the thermal enhancement bonding coating may vary. Further, while shown and described as providing multiple permanent magnets in each slot, it should be understood that each slot may also be provided with a single permanent magnet.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. A rotor assembly for a permanent magnet electric machine comprising:
    a plurality of rotor laminations joined to form a rotor body, each of the plurality of rotor laminations including a plurality of slots; and
    one or more permanent magnets mounted within respective ones of the plurality of slots, each of the one or more permanent magnets including a thermal enhancement bonding coating.

2. The rotor assembly according to claim 1, wherein the thermal enhancement bonding coating comprises a solder paste including a solder material and a flux material.

3. The rotor assembly according to claim 2, wherein the solder material comprises tin.

4. The rotor assembly according to claim 2, wherein the flux material comprises a thermal interface material.

5. The rotor assembly according to claim 4, wherein the thermal interface material comprises one of a metal and a ceramic.

6. The rotor assembly according to claim 5, wherein the metal comprises at least one of aluminum and copper.

7. The rotor assembly according to claim 5, wherein the ceramic comprises at least one of boron nitride and beryllium oxide.

8. A permanent magnet electric machine comprising:
    a housing;
    a stator mounted within the housing; and
    a rotor assembly rotatably mounted within the housing relative to the stator, the rotor assembly including a plurality of rotor laminations, each of the plurality of rotor laminations including a plurality of slots and one or more permanent magnets mounted within respective ones of the plurality of slots, each of the one or more permanent magnets including a thermal enhancement bonding coating.

9. The rotor assembly according to claim 8, wherein the thermal enhancement bonding coating comprises a solder paste including a solder material and a flux material.

10. The rotor assembly according to claim 9, wherein the solder material comprises tin.

11. The rotor assembly according to claim 9, wherein the flux material comprises a thermal interface material.

12. The rotor assembly according to claim 11, wherein the thermal interface material comprises one of a metal and a ceramic.

13. The rotor assembly according to claim 12, wherein the metal comprises at least one of aluminum and copper.

14. The rotor assembly according to claim 12, wherein the ceramic comprises at least one of boron nitride and beryllium oxide.

* * * * *